(12) United States Patent
Kobayashi et al.

(10) Patent No.: US 10,838,655 B2
(45) Date of Patent: Nov. 17, 2020

(54) MEMORY SYSTEM INCLUDING MULTIPLE MEMORIES CONNECTED IN SERIES

(71) Applicant: TOSHIBA MEMORY CORPORATION, Tokyo (JP)

(72) Inventors: Hiroyuki Kobayashi, Yokohama Kanagawa (JP); Jun Deguchi, Kawasaki Kanagawa (JP); Junji Wadatsumi, Ota Tokyo (JP); Takashi Toi, Kawasaki Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 212 days.

(21) Appl. No.: 15/905,822

(22) Filed: Feb. 27, 2018

(65) Prior Publication Data

US 2019/0087121 A1    Mar. 21, 2019

(30) Foreign Application Priority Data

Sep. 20, 2017    (JP) ................................ 2017-180351

(51) Int. Cl.
  *G06F 3/06*    (2006.01)
  *G06F 13/42*    (2006.01)
  *H04L 7/033*    (2006.01)
  *H04L 7/00*    (2006.01)
  *G06F 13/16*    (2006.01)

(52) U.S. Cl.
  CPC .......... *G06F 3/0658* (2013.01); *G06F 3/0625* (2013.01); *G06F 3/0679* (2013.01); *G06F 13/1689* (2013.01); *G06F 13/4243* (2013.01); *H04L 7/0008* (2013.01); *H04L 7/033* (2013.01)

(58) Field of Classification Search
  None
  See application file for complete search history.

(56) References Cited

U.S. PATENT DOCUMENTS

| 7,418,533 B2 | 8/2008 | Ohara et al. |
| 8,122,202 B2 | 2/2012 | Gillingham |
| 8,352,663 B2 | 1/2013 | Hirayama |
| 8,452,908 B2 * | 5/2013 | Chengson ........... G06F 13/1689 710/305 |

(Continued)

FOREIGN PATENT DOCUMENTS

| JP | 2003-316752 A | 11/2003 |
| JP | 2007-148764 A | 6/2007 |
| JP | 2010-33125 A | 2/2010 |

*Primary Examiner* — Michael Alsip
(74) *Attorney, Agent, or Firm* — Kim & Stewart LLP

(57) ABSTRACT

A memory system includes first, second, third, and fourth nonvolatile memory, a memory controller configured to modulate write data for the first and second memory into a first time slot of a data signal according to an allocation scheme, and modulate write data for the third and fourth memory into a second time slot of the data signal according to the allocation scheme, a first bridge circuit configured according to the allocation scheme to extract first write data from the first time slot, a second bridge circuit configured according to the allocation scheme to extract second write data from the first time slot, a third bridge circuit configured according to the allocation scheme to extract third write data from the second time slot, and a fourth bridge circuit configured according to the allocation scheme to extract fourth write data from the second time slot.

18 Claims, 13 Drawing Sheets

(56) References Cited

U.S. PATENT DOCUMENTS

| | | |
|---|---|---|
| 8,463,959 B2 | 6/2013 | Choi |
| 8,671,252 B2 * | 3/2014 | Kim .................. G06F 13/1694 |
| | | 711/154 |
| 8,837,655 B2 | 9/2014 | Pyeon |
| 9,148,277 B2 | 9/2015 | Pyeon et al. |

* cited by examiner

MEMORY SYSTEM INCLUDING MULTIPLE MEMORIES CONNECTED IN SERIES

CROSS-REFERENCE TO RELATED APPLICATION

This application is based upon and claims the benefit of priority from Japanese Patent Application No. 2017-180351, Sep. 20, 2017, the entire contents of which are incorporated herein by reference.

FIELD

Embodiments described herein relate generally to a memory system.

BACKGROUND

In the related art, memory systems in which nonvolatile memory devices are mounted as external storage devices are used in computer systems. Memory systems include memory controllers and memory devices connected to the controllers. Communication with external devices is carried out through serial interfaces and communication with memory devices is carried out through memory interfaces. In general, in view of communication speeds in such memory systems, capacity enlargement and bandwidth increases are achieved by connecting memory devices in parallel. Since wiring loads increase for parallel connections, there is a limitation on the bandwidth increases through parallelization. Further, with recent bandwidth increases of serial interfaces, large capacities and high bandwidth memory systems are further necessary.

DETAILED DESCRIPTION

Embodiments provide a memory system with a large capacity and high bandwidth that is able to resolve a mismatch of data transmission speeds between a serial interface and a memory interface.

In general, according to one embodiment, a memory system includes first, second, third, and fourth memory, each of which is a nonvolatile memory, a memory controller configured to modulate first write data for the first memory and second write data for the second memory into a first time slot of a data signal according to an allocation scheme, and modulate third write data for the third memory and fourth write data for the fourth memory into a second time slot of the data signal that is subsequent to the first time slot, according to the allocation scheme, wherein the allocation scheme defines in which of the first and second time slots the write data for the first, second, third, and fourth memory are to be modulated, a first bridge circuit configured according to the allocation scheme to extract the first write data from the first time slot of the data signal, a second bridge circuit configured according to the allocation scheme to extract the second write data from the first time slot of the data signal, a third bridge circuit configured according to the allocation scheme to extract the third write data from the second time slot of the data signal, and a fourth bridge circuit configured according to the allocation scheme to extract the fourth write data from the second time slot of the data signal.

Hereinafter, a memory system according to embodiments will be described in detail with reference to the drawings. Embodiments of the present disclosure are not limited to following disclosed embodiments.

First Embodiment

Figure 1:
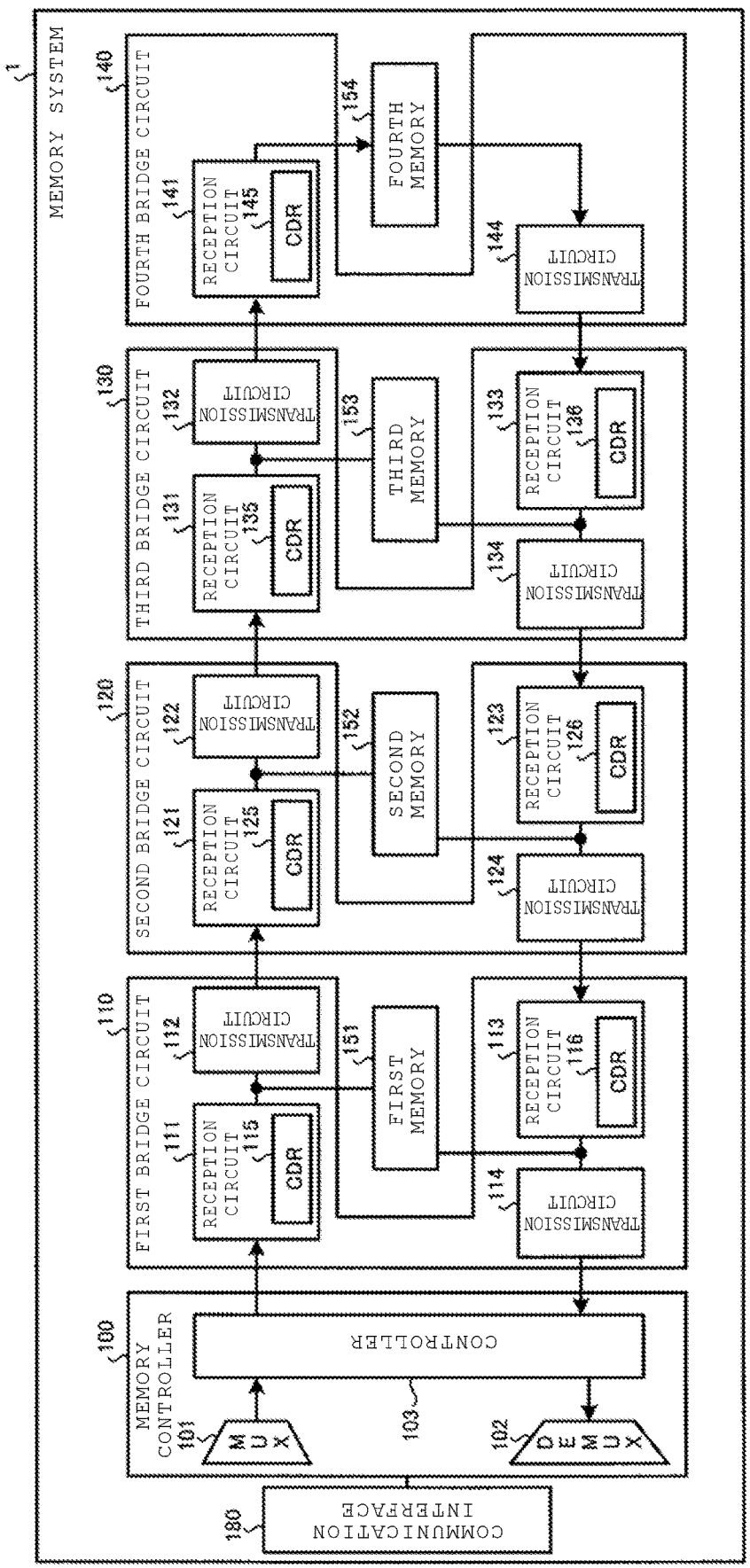
FIG. 1 is a diagram illustrating a memory system according to a first embodiment.

FIG. 1 is a diagram illustrating a memory system 1 according to a first embodiment. The memory system 1 transmits and receives data to and from a host (not illustrated). The host corresponds to, for example, a personal computer, a portable information terminal, or a server. The memory system 1 can receive an access request (e.g., a read request and a write request) from the host. Examples of the memory system 1 include a solid state drive (SSD) and a security digital (SD) memory card.

The memory system 1 includes a communication interface 180, a memory controller 100, a first bridge circuit 110, a second bridge circuit 120, a third bridge circuit 130, a fourth bridge circuit 140, a first memory 151, a second memory 152, a third memory 153, and a fourth memory 154.

The communication interface 180 may be an interface circuit used to transmit data to and receive data from the host.

The first memory 151, the second memory 152, the third memory 153, and the fourth memory 154 are, for example, a package of a NAND flash memory (NAND memory) chips. In the embodiment, the first memory 151, the second memory 152, the third memory 153, and the fourth memory 154 are not limited to the package of the NAND memory chips, but may be configured as, for example, a plurality of memory devices such as a plurality of memory device groups connected in parallel with memory interfaces therebetween or memory chip groups stacked in packages. In the embodiment, NAND memory is used as an example of a nonvolatile memory, but any nonvolatile memory may be used. For example, in the memory system 1, an NOR flash memory may be used instead of the NAND memory. In the embodiment, a case in which the number of packages is 4 will be described, but the number of packages is not limited to any particular number.

The memory controller 100 includes a multiplexing unit 101, a demultiplexing unit 102, and a controller 103, and transmits data from the first memory 151 to the fourth memory 154 to the host and data from the host to the first memory 151 to the fourth memory 154.

The multiplexing unit (MUX) 101 combines communication data of 1-bit unit to be transmitted to the first memory 151 to the fourth memory 154. In the embodiment, unit communication data combined and stored as data to be written (hereinafter referred to as write data) is referred to as a write symbol.

Figure 2:
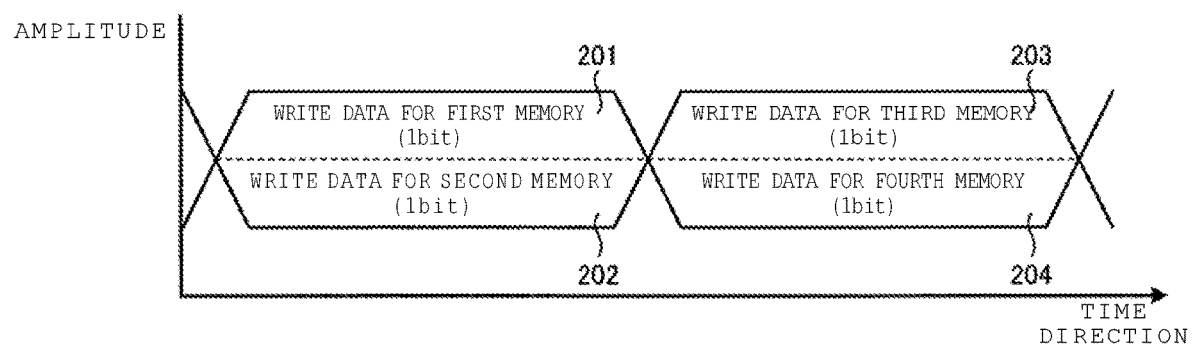
FIG. 2 is a diagram illustrating a write symbol collected by a multiplexing unit of the memory system according to the first embodiment.

FIG. 2 is a diagram illustrating a write symbol collected by a multiplexing unit 101 according to the embodiment. In the example illustrated in FIG. 2, the write symbol includes write data (1 bit) 201 for the first memory 151, write data (1 bit) 202 for the second memory 152, write data (1 bit) 203 for the third memory 153, and write data (1 bit) 204 for the fourth memory 154. That is, the multiplexing unit 101 combines 4-bit write data into one write symbol.

The write symbol illustrated in FIG. 2 includes storage regions for 2-bit data in an amplitude direction and 2-bit data in a time direction. A region of the storage regions is allocated in advance for each package (the first memory 151 to the fourth memory 154) of the memory installed in the memory system 1 according to the embodiment to store 1-bit data to be transmitted to the package of the memory.

A scheme of allocating a region in advance for each package of the memory will be described. When the memory system 1 is activated, the memory controller 100 transmits unique IDs to the first bridge circuit 1210 to the fourth bridge circuit 1240. The first bridge circuit 1210 to the fourth bridge circuit 1240 can then identify regions allocated in advance to their corresponding circuits in accordance with the transmitted IDs. Thus, at the time of data communication, the write data (1 bit) for each memory can be extracted from the region allocated in advance at the time of activation. In the embodiment, an example of the allocation scheme has been described. A region allocated in advance for each memory at the time of manufacturing and shipment may be set.

An example in which the multiplexing unit 101 according to the embodiment uses pulse-amplitude modulation (PAM) 4 (4-level pulse-amplitude modulation) to deliver 2-bit information in one time slot will be described. However, another scheme may be used. In the embodiment, an example in which regions for storing data are arranged in the amplitude direction and the time direction has been described. However, regions for storing data in one of the amplitude direction and the time direction may be arranged. In the embodiment, an example in which 1-bit data is stored for each package of the memory has been described. However, the data may not be limited to 1 bit. For example, 2-bit data may be stored.

In the related art, when data is transmitted from a memory controller to a plurality of bridge circuits, it is necessary to add address information for specifying to a bridge circuit of a data transmission destination. In this case, since the address information is added to information to be transmitted, data transmission efficiency deteriorates and a transmission speed is lowered. When data to which the address information is added is transmitted, it is necessary to perform, for example, a process of determining whether the data is data destined for a self-circuit in each bridge circuit. Therefore, when a plurality of bridge circuits are connected in series and data is transmitted from a bridge circuit at the front stage to a bridge circuit at the rear stage, delay is introduced by each bridge circuit, which may become a problem. On the other hand, when the data to which the address information is added is transmitted to all of the connected bridge circuits in order to increase a speed, a problem occurs in that power consumption increases.

By contrast, the memory controller 100 according to the embodiment is assumed to store data to be transmitted to a bridge circuit in a region allocated in advance for each bridge circuit. Thus, the bridge circuit can receive data for which it has been set as a transmission destination even through address information is not provided, by reading 1-bit data from a region allocated in advance to that bridge circuit.

The multiplexing unit 101 according to the embodiment embeds a synchronization signal (e.g., clock) used by each bridge circuit (the first bridge circuit 110 to the fourth bridge circuit 140) to specify the start of the write symbol that contains a storage region in which data of the that circuit is stored. A known scheme may be used to embed the synchronization signal, and thus the description thereof will be omitted. The embodiment is not limited to the scheme of embedding the synchronization signal in the same signal along with the write symbol, but the synchronization signal may be transmitted through another signal. In this way, any scheme may be used as a scheme of transmitting the synchronization signal.

The controller 103 in FIG. 1 controls transmission of data with the first bridge circuit 110. For example, the controller 103 transmits the write symbol multiplexed by the multiplexing unit 101 to the first bridge circuit 110.

The controller 103 also receives a read symbol from the first bridge circuit 110. In the embodiment, unit communication data in which 1-bit read data read from the first memory 151 to the fourth memory 154 is collected and stored, is referred to as a read symbol.

Figure 3:
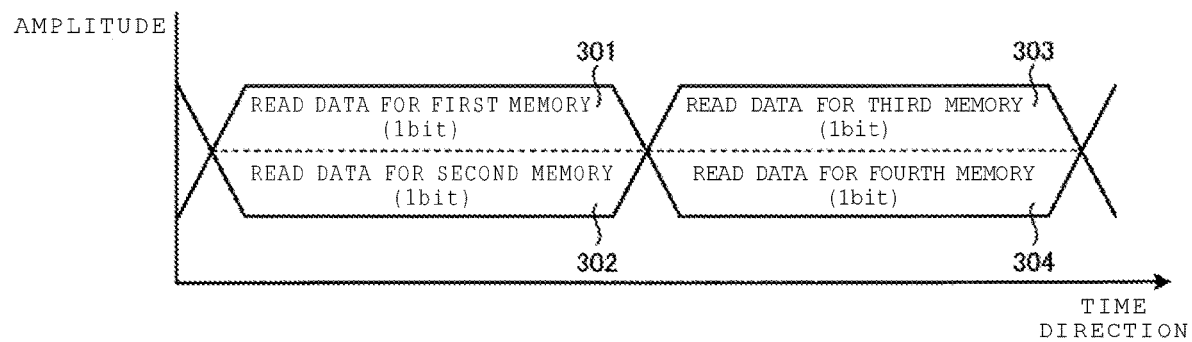
FIG. 3 is a diagram illustrating a read symbol received by a NAND controller of the memory system according to the first embodiment.

FIG. 3 is a diagram illustrating a read symbol received by the NAND controller 103. In the example illustrated in FIG. 3, read data (1 bit) 301 read from the first memory 151 (hereinafter referred to as read data of the first memory 151), read data (1 bit) 302 of the second memory 152, read data (1 bit) 303 of the third memory 153, and read data (1 bit) 304 of the fourth memory 154 are stored in the read symbol. That is, the controller 103 receives a 4-bit read symbol in which read data of 1 bit unit read from each of the first memory 151 to the fourth memory 154 is collected.

In the read symbol illustrated in FIG. 3, storage regions of 2-bit data in the amplitude direction and 2-bit data in the time direction are arranged. A region of these storage regions is allocated in advance for each package (the first memory 151 to the fourth memory 154) of the memory installed in the memory system 1 according to the embodiment to store data of 1 bit unit read from the package of the memory.

Referring back to FIG. 1, the demultiplexing unit (DE-MUX) 102 reads data of 1 bit unit from the regions allocated in advance for each package (the first memory 151 to the fourth memory 154) of the memory for each of the received read symbols and generates data for each package (the first memory 151 to the fourth memory 154) of the memory. Then, the generated data is transmitted from the communication interface 180 to the host.

The first bridge circuit 110 is a bridge circuit that controls reading and writing of data from and to the first memory 151 and includes a reception circuit 111, a transmission circuit 112, a reception circuit 113, and a transmission circuit 114. In the embodiment, an example in which the first bridge circuit 110 controls reading and writing of data from and to the first memory 151 will be described. However, only one of the reading and the writing of the data may be controlled at one time.

The first bridge circuit 110 reads 1-bit write data from the region allocated in advance to the first memory 151 in the write symbol transmitted from the memory controller 100.

The reception circuit 111 includes a CDR 115. The CDR 115 synchronizes a phase of the write symbol with the synchronization signal transmitted along with the write symbol from the memory controller 100.

Figure 4:
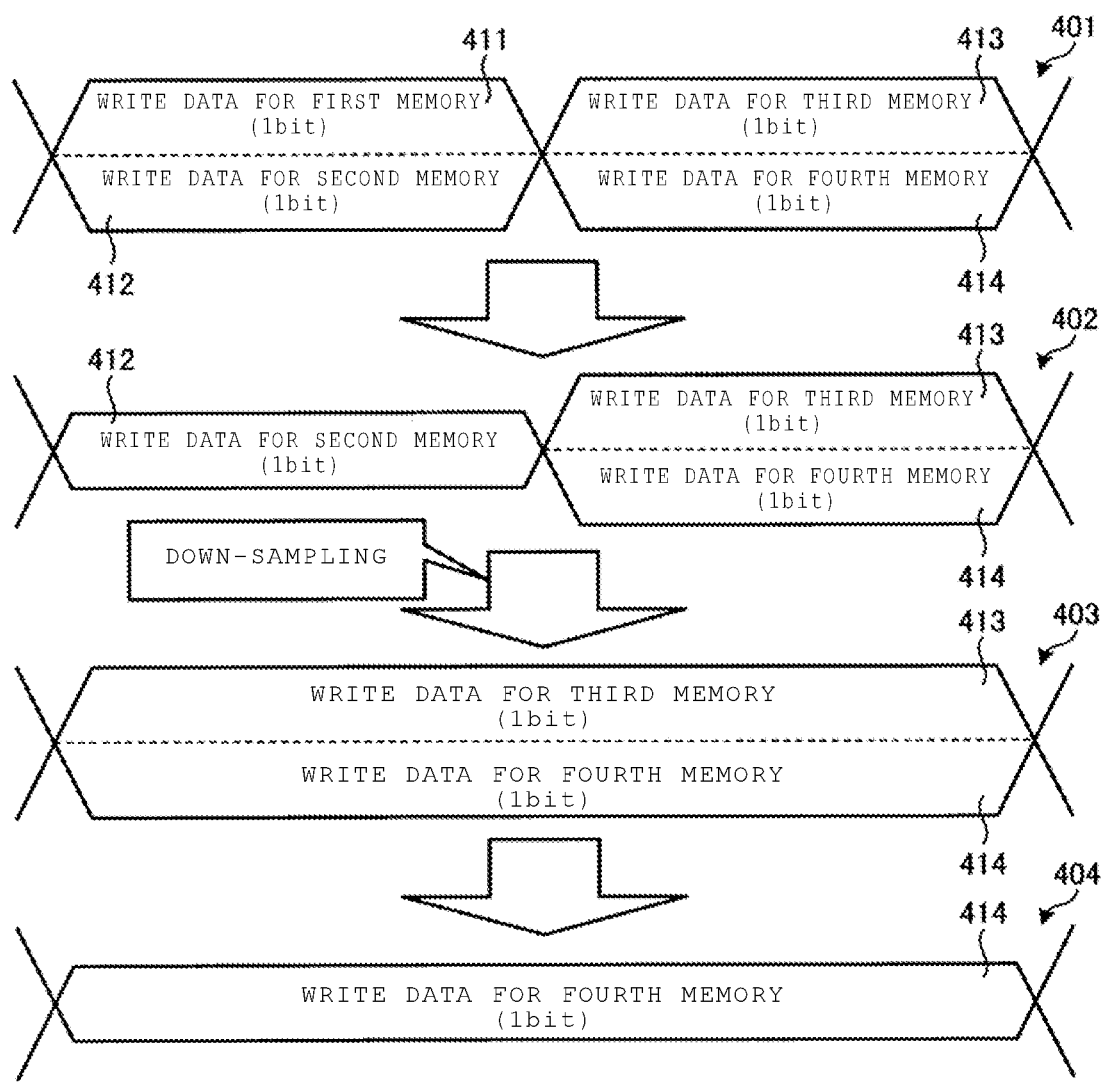
FIG. 4 is a diagram illustrating a transition of the write symbol transmitted in the memory system according to the first embodiment.

FIG. 4 is a diagram illustrating a transition of the write symbol transmitted in the memory system 1 according to the embodiment. As illustrated in FIG. 4, the memory controller 100 transmits a write symbol 401 in which write data (1 bit) 411 for the first memory 151, write data (1 bit) 412 for the second memory 152, write data (1 bit) 413 for the third memory 153, and write data (1 bit) 414 for the fourth memory 154 are stored.

Then, the reception circuit 111 reads the write data (1 bit) 411 for the first memory 151 from the region allocated in advance to the first memory 151 in the write symbol 401 transmitted from the memory controller 100 (as illustrated in FIG. 4) using a synchronization signal as a reference. Then, the reception circuit 111 controls writing to the first memory 151 based on the write data 411 for the first memory 151.

Thereafter, the reception circuit 111 exchanges the write symbol 401 and the synchronization signal with the transmission circuit 112.

Then, the transmission circuit 112 removes (eliminates) the write data (1 bit) 411 for the first memory 151 from the region allocated for the first memory 151 in the write symbol 401 using the synchronization signal as a reference and generates a write symbol 402. As illustrated in FIG. 4, the write symbol 402 includes write data (1 bit) 412 for the second memory 152, write data (1 bit) 413 for the third memory 153, and write data (1 bit) 414 for the fourth memory 154.

Then, the transmission circuit 112 transmits a signal in which the synchronization signal received from the CDR 115 is included in the write symbol 402 to the second bridge circuit 120. Any scheme may be used as a scheme of including the synchronization signal in the write symbol 402. For example, the synchronization signal may be included as amplitude information at a timing at which a signal edge of the write symbol 402 occurs. A data amount of the write symbol 402 is less than that of the write symbol 401 in the amplitude direction in which the write symbol is removed (eliminated). Thus, the memory system 1 according to the embodiment can realize a reduction of power consumption since a voltage used in the amplitude direction can be reduced. Next, the second bridge circuit 120 will be described. A reception circuit 113 and a transmission circuit 114 of the first bridge circuit 110 will be described below.

The second bridge circuit 120 is a bridge circuit that controls reading and writing of data from and to the second memory 152 and includes a reception circuit 121, a transmission circuit 122, a reception circuit 123, and a transmission circuit 124. In the embodiment, an example in which the second bridge circuit 120 controls reading and writing of data from and to the second memory 152 will be described. However, only one of the reading and the writing of data may be controlled at the same time.

The reception circuit 121 includes a CDR 125. The CDR 125 synchronizes a phase with a synchronization signal (e.g., clock) transmitted along with the write symbol 402 from a signal transmitted from the first bridge circuit 110.

Then, the reception circuit 121 reads the write data (1 bit) 412 for the second memory 152 from the write symbol 402 transmitted from the first bridge circuit 110 using the synchronization signal as a reference (as illustrated in FIG. 4). Then, the reception circuit 121 controls writing to the second memory 152 based on the write data 412 for the second memory 152.

The transmission circuit 122 generates a write symbol 403 by removing the write data (1 bit) 412 for the second memory 152 from the region allocated for the second memory 152 in the write symbol 402 using the synchronization signal as a reference. As illustrated in FIG. 4, the write symbol 403 includes the write data (1 bit) 413 for the third memory 153 and the write data (1 bit) 414 for the fourth memory 154.

Then, the transmission circuit 122 transmits a signal in which a signal including the synchronization signal received from the CDR 125 is included in the write symbol 403 to the third bridge circuit 130. A data amount of the write symbol 403 is less than that of the write symbol 402 in the time direction. Thus, the transmission circuit 122 according to the embodiment transmits data that is down-sampled from the write symbol 402 as the write symbol 403 to the third bridge circuit 130. Thus, it is possible to realize a reduction in the power consumption. Next, the third bridge circuit 130 will be described. The reception circuit 123 and the transmission circuit 124 of the second bridge circuit 120 will be described below.

The third bridge circuit 130 is a bridge circuit that controls reading and writing of data from and to the third memory 153 and includes a reception circuit 131, a transmission circuit 132, a reception circuit 133, and a transmission circuit 134. In the embodiment, an example in which the third bridge circuit 130 controls reading and writing of data from and to the third memory 153 will be described. However, only one of the reading and the writing of data may be controlled at the same time.

The reception circuit 131 includes a CDR 135. The CDR 135 synchronizes a phase with a synchronization signal (e.g., clock) transmitted along with the write symbol 403 from a signal transmitted from the second bridge circuit 120.

Then, the reception circuit 131 reads the write data (1 bit) 413 for the third memory 153 from the write symbol 403 transmitted from the second bridge circuit 120 using the synchronization signal as a reference (as illustrated in FIG.

4). Then, the reception circuit 131 controls writing to the third memory 153 based on the write data (1 bit) 413 for the third memory 153.

The transmission circuit 132 generates a write symbol 404 by removing the write data (1 bit) 413 for the third memory 153 from the region allocated for the third memory 153 in the write symbol 403 using the synchronization signal as a reference. As illustrated in FIG. 4, the write symbol 404 includes the write data (1 bit) 414 for the fourth memory 154.

Then, the transmission circuit 132 transmits a signal in which a signal including the synchronization signal received from the CDR 135 is included in the write symbol 404 to the fourth bridge circuit 140. A data amount of the write symbol 404 is less than that of the write symbol 403. Thus, since the memory system 1 according to the embodiment can reduce a voltage used in the amplitude direction, it is possible to realize a reduction in the power consumption. Next, the fourth bridge circuit 140 will be described. The reception circuit 133 and the transmission circuit 134 of the third bridge circuit 130 will be described below.

The fourth bridge circuit 140 is a bridge circuit that controls reading and writing of data from and to the fourth memory 154 and includes at least a reception circuit 141 and a transmission circuit 144. In the embodiment, an example in which the fourth bridge circuit 140 controls reading and writing of data from and to the fourth memory 154 will be described. However, only one of the reading and the writing of data may be controlled at the same time.

The reception circuit 141 includes a CDR 145. The CDR 145 synchronizes a phase with a synchronization signal (e.g., clock) transmitted along with the write symbol 404 from a signal transmitted from the third bridge circuit 130.

Then, the reception circuit 141 reads the write data (1 bit) 414 for the fourth memory 154 from the write symbol 404 transmitted from the third bridge circuit 130 using the synchronization signal as a reference (as illustrated in FIG. 4). Then, the reception circuit 141 controls writing to the fourth memory 154 based on the write data (1 bit) 414 for the fourth memory 154.

Next, a process in which the bridge circuits (the first bridge circuit 110 to the fourth bridge circuit 140) of the memory system 1 according to the embodiment exchanges the data read from the first memory 151 to the fourth memory 154 with the memory controller 100 will be described.

In the embodiment, similarly with when the bridge circuits (the first bridge circuit 110 to the fourth bridge circuit 140) exchange write data with the first memory 151 to the fourth memory 154, unit communication data (a read symbol) in which 1-bit data (hereafter referred to as read data) read from the first memory 151 to the fourth memory 154 is collected, is exchanged with the memory controller 100.

First, the transmission circuit 144 generates a read symbol in which the read data read from the fourth memory 154 is stored using the synchronization signal as a reference. As the synchronization signal, the synchronization signal transmitted from the transmission circuit 132 may be used or may be newly generated.

Figure 5:
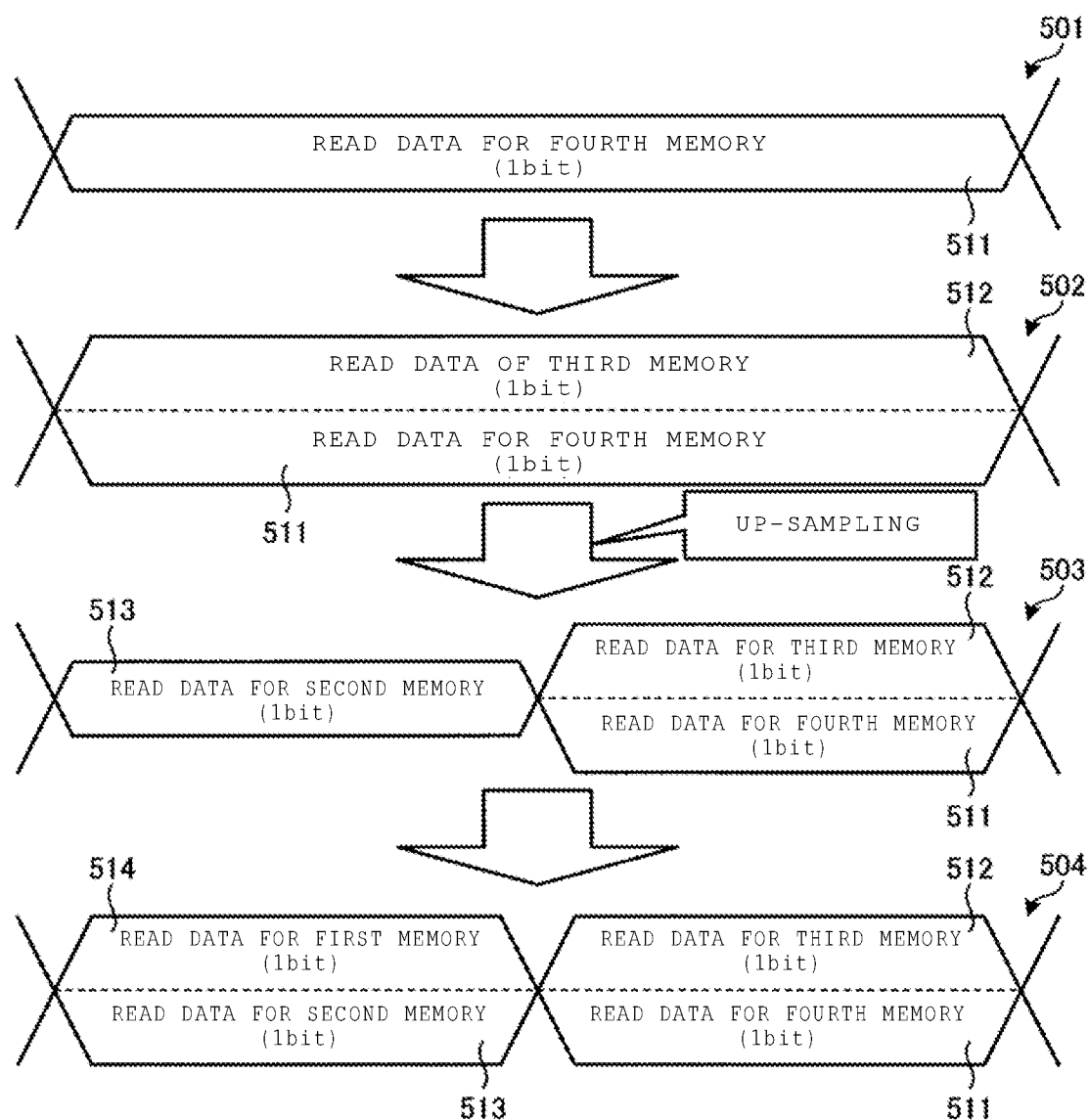
FIG. 5 is a diagram illustrating a transition of the read symbol transmitted in the memory system according to the first embodiment.

FIG. 5 is a diagram illustrating a transition of the read symbol transmitted in the memory system 1 according to the embodiment. As illustrated in FIG. 5, the transmission circuit 144 transmits a read symbol 501 in which read data (1 bit) 511 of the fourth memory 154 is stored.

Then, the transmission circuit 144 transmits a signal in which a synchronization signal used to generate the read symbol 501 is included in the read symbol 501 to the third bridge circuit 130. Next, the reception circuit 133 and the transmission circuit 134 of the third bridge circuit 130 will be described.

The reception circuit 133 of the third bridge circuit 130 includes a CDR 136. The CDR 136 synchronizes a phase with a synchronization signal (e.g., clock) transmitted along with the read symbol 501 from a signal transmitted from the fourth bridge circuit 140.

The transmission circuit 134 stores read data (1 bit) 512 read from the third memory 153 in the region allocated for the third memory 153 in the read symbol 501 using the synchronization signal as a reference and generates a read symbol 502. As illustrated in FIG. 5, the read symbol 502 includes read data (1 bit) 512 of the third memory 153 and read data (1 bit) 511 of the fourth memory 154.

The transmission circuit 134 transmits a signal in which the synchronization signal received from the CDR 136 is included in the read symbol 502 to the second bridge circuit 120. Next, the reception circuit 123 and the transmission circuit 124 of the second bridge circuit 120 will be described.

The reception circuit 123 of the second bridge circuit 120 includes a CDR 126. The CDR 126 synchronizes a phase with a synchronization signal (e.g., clock) transmitted along with the read symbol 502 from a signal transmitted from the third bridge circuit 130.

The transmission circuit 124 stores read data (1 bit) 513 read from the second memory 152 in the region allocated for the second memory 152 in the read symbol 502 using the synchronization signal as a reference and generates a read symbol 503. As illustrated in FIG. 5, the read symbol 503 includes read data (1 bit) 513 of the second memory 152, the read data (1 bit) 512 of the third memory 153, and the read data (1 bit) 511 of the fourth memory 154.

The transmission circuit 124 transmits a signal in which the synchronization signal received from the CDR 126 is included in the read symbol 503 to the first bridge circuit 110. The transmission circuit 124 performs up-sampling to double a sampling frequency when transmitting the read symbol 503. Next, the reception circuit 113 and the transmission circuit 114 of the first bridge circuit 110 will be described.

The reception circuit 113 of the first bridge circuit 110 includes a CDR 116. The CDR 116 synchronizes a phase with a synchronization signal (e.g., clock) transmitted along with the read symbol 503 from a signal transmitted from the second bridge circuit 120.

The transmission circuit 114 stores read data (1 bit) 514 read from the first memory 151 in the region allocated for the first memory 151 in the read symbol 503 using the synchronization signal as a reference and generates a read symbol 504. As illustrated in FIG. 5, the read symbol 504 includes read data (1 bit) 514 of the first memory 151, the read data (1 bit) 513 of the second memory 152, the read data (1 bit) 512 of the third memory 153, and the read data (1 bit) 511 of the fourth memory 154.

Then, the transmission circuit 114 transmits a signal in which the synchronization signal received from the CDR 116 is included in the read symbol 504 to the memory controller 100.

Thus, the memory controller 100 receives the read symbol 504. In the embodiment, by performing the above-described processes, the memory controller 100 may receive the read data for each bit read from the first memory 151 to the fourth memory 154.

In the embodiment, up-sampling and down-sampling is performed in accordance with the data amounts of the read and write symbols in the time direction. Thus, since only the necessary frequency and amplitude are set in accordance with the data amounts, power saving in the memory system 1 can be realized.

In the embodiment, when the read data is transmitted with the read symbol and the write data is transmitted with the write symbol, it is not necessary to store the address information for specifying the bridge circuit of a transmission destination. Thus, it is possible to reduce the data amount to be transmitted.

In the embodiment, the description will be omitted assuming that information regarding a write destination for the write data on the first memory 151 to the fourth memory 154 can be uniquely determined from its data location within the write symbol.

In the embodiment, a case in which the first memory 151, the second memory 152, the third memory 153, and the fourth memory 154 are packages of NAND flash memory has been described, but embodiments are not limited to the packages of the NAND flash memory. The embodiments are not limited by the number of packages, a plurality of memory groups connected in parallel with memory interfaces therebetween, and memory chip groups stacked in packages installed in the memory system 1. An appropriate number of packages or the like is installed according to embodiments.

Modification Example 1 of First Embodiment

The synchronization signal according to the first embodiment is not particularly limited. Incidentally, when a plurality of bridge circuits in the related art are connected in series, the CDRs of all the bridge circuits need embedded clock to synchronize received data. Therefore, a ratio of data included in a signal to be transmitted decreases and a problem occurs in that an effective data rate is lowered. Accordingly, in Modification Example 1, an embedding timing of a clock for preventing the decrease in the effective data rate will be described. A configuration of Modification Example 1 is the same as that of the first embodiment.

Figure 6:
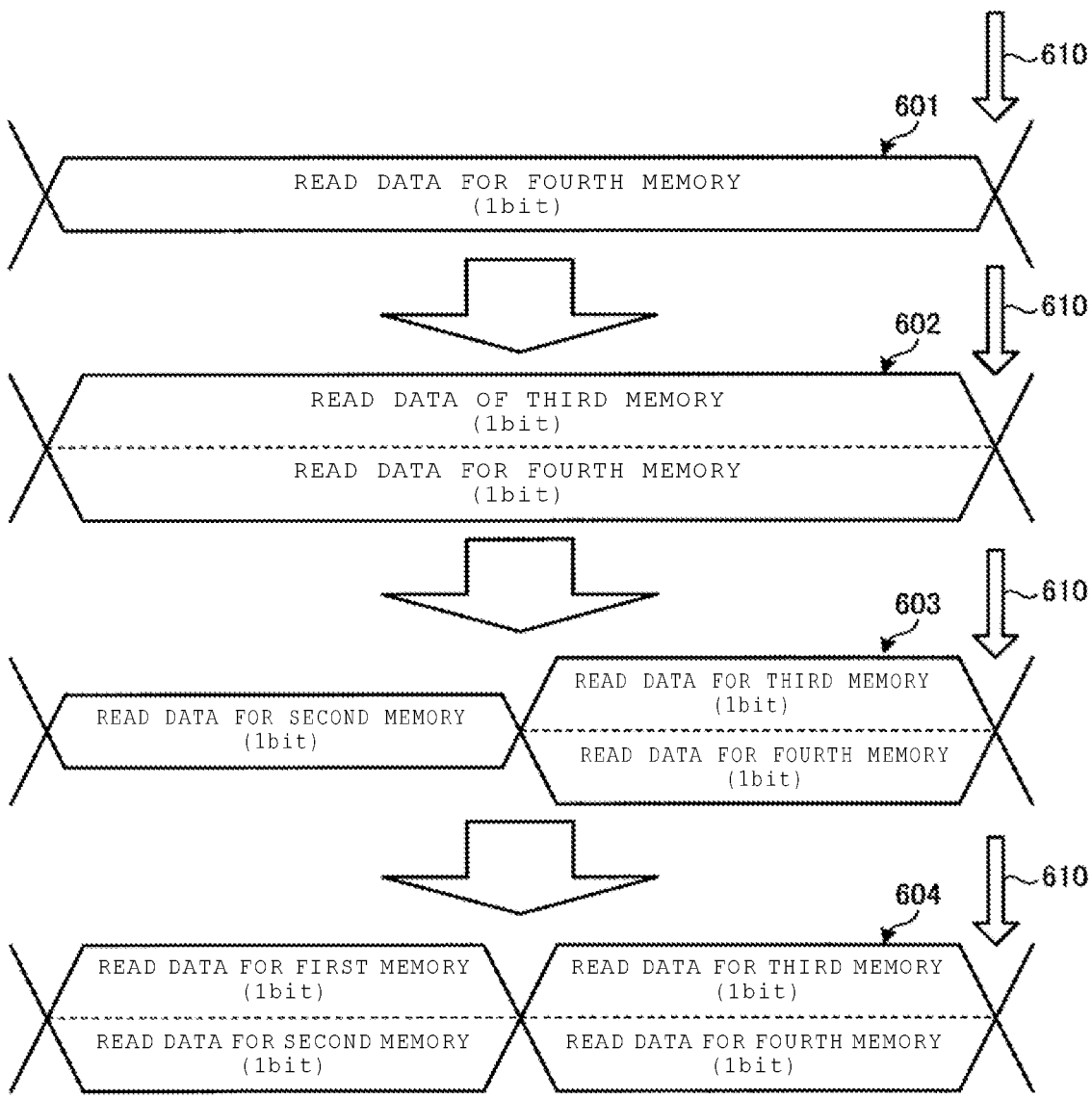
FIG. 6 is a diagram illustrating a relationship between a read symbol and an embedding timing of a clock according to Modification Example 1 of the first embodiment.

First, an embedding timing of a clock (synchronization signal) for a read symbol will be described. FIG. 6 is a diagram illustrating a relationship between a read symbol and an embedding timing of a clock according to Modification Example 1. As illustrated in FIG. 6, a read symbol 601 is transmitted from the fourth bridge circuit 140. Then, the third bridge circuit 130 receiving the read symbol 601 transmits a read symbol 602. The second bridge circuit 120 receiving the read symbol 602 transmits a read symbol 603. The first bridge circuit 110 receiving the read symbol 603 transmits a read symbol 604. In this way, whenever the read symbol passes through the bridge circuit, the read symbol is changed in the amplitude direction and the time direction.

However, a signal edge 610 corresponding to a timing of a change in the amplitude of the read symbol 601 is maintained in the read symbol 604 transmitted by the first bridge circuit 110.

Accordingly, in the modification example, the transmission circuit 144 of the fourth bridge circuit 140 embeds the synchronization signal (e.g., clock) as amplitude information at a timing (the signal edge 610) of a change in the amplitude of the read symbol 601 when the read symbol 601 in which 1-bit data read from the fourth memory 154 is stored is transmitted. Any scheme may be used as a method of embedding the synchronization signal (e.g., clock) as the amplitude information.

The data transmission scheme is not limited by the modification example. For example, a non-return-to-zero (NRZ) scheme is considered to be used. Next, a case in which the synchronization signal (e.g., clock) remains even when the transmission circuit 134 of the third bridge circuit 130 stores read data (1 bit) of the third memory 153 in the read symbol 601 and generates the read symbol 602 will be described.

Figure 7:
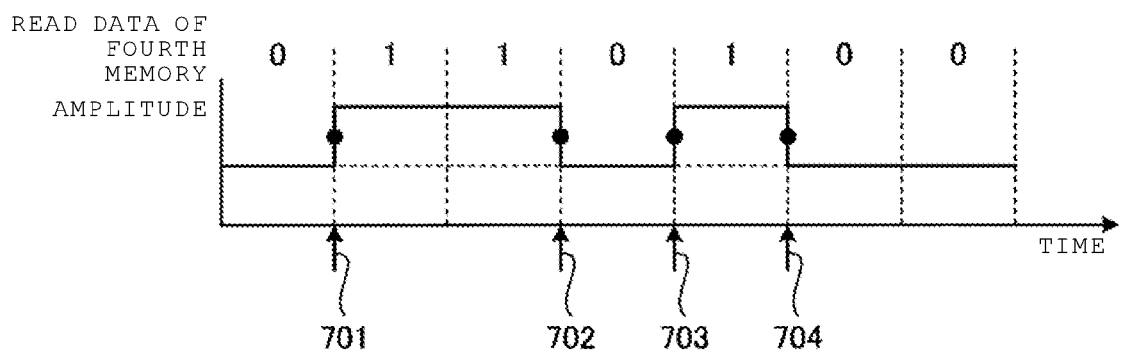
FIG. 7 is a diagram illustrating a read symbol that stores read data of a fourth memory transmitted by a transmission circuit of a fourth bridge circuit according to Modification Example 1 of the first embodiment.

FIG. 7 is a diagram illustrating a read symbol that stores read data of the fourth memory 154 transmitted by the transmission circuit 144 of the fourth bridge circuit 140 according to Modification Example 1 of the first embodiment. In the example illustrated in FIG. 7, the transmission circuit 144 embeds the synchronization signal (e.g., clock) at timings 701, 702, 703, and 704 at which the amplitude of the read symbol is changed.

Figure 8A:
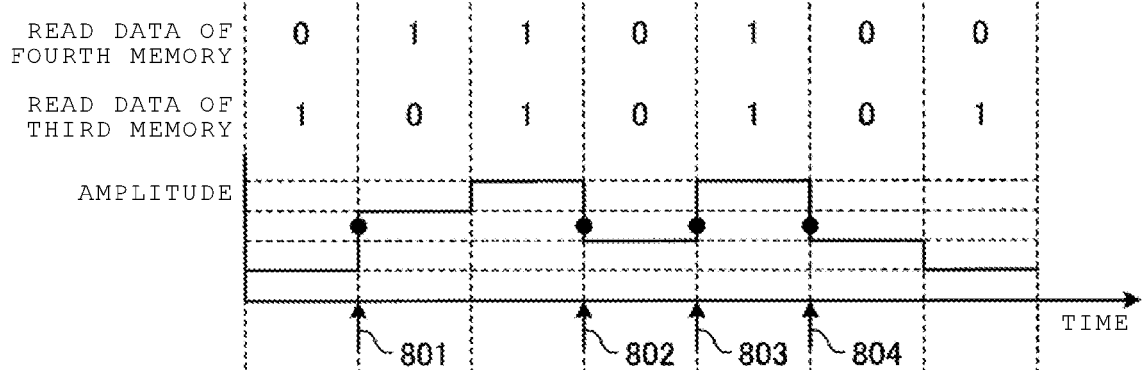
FIGS. 8A and 8B are diagrams illustrating a read symbol that stores read data of third memory and fourth memory transmitted by a transmission circuit of a third bridge circuit according to Modification Example 1 of the first embodiment.
Figure 8B:
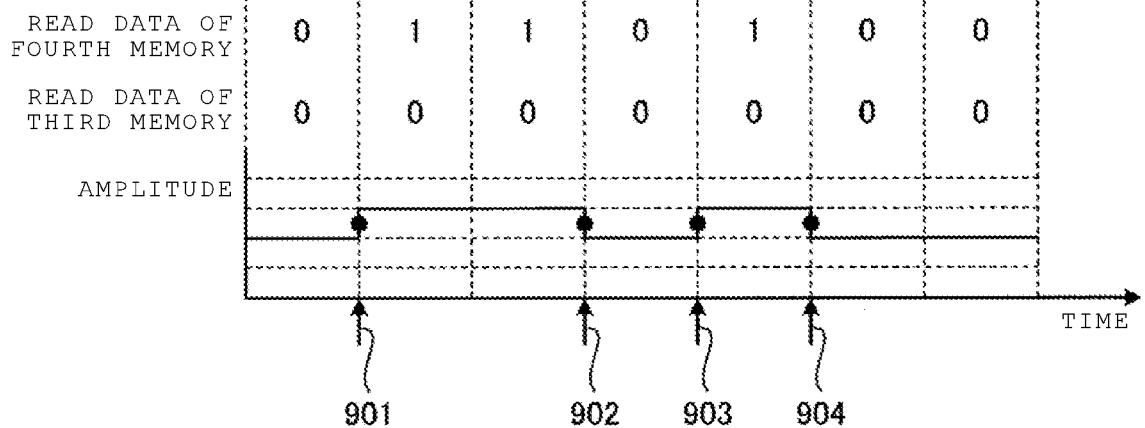

FIGS. 8A and 8B are diagrams illustrating a read symbol that stores read data of the third memory 153 and the fourth memory 154 transmitted by the transmission circuit 134 of the third bridge circuit 130 according to Modification Example 1 of the first embodiment. In the example illustrated in FIG. 8A, for example, read data "1010101" of the third memory 153 is stored in read data "0110100" of the fourth memory 154. In this case, it can be confirmed in FIG. 7 that signal edges embedding the synchronization signal (e.g., clock) remain at timings 801, 802, 803, and 804.

In the example illustrated in FIG. 8B, for example, read data "0000000" of the third memory 153 is stored in read data "0110100" of the fourth memory 154. Even when newly stored read data is all "0", it can be confirmed in FIG. 7 that signal edges embedding the synchronization signal (e.g., clock) remain at timings 901, 902, 903, and 904.

As illustrated in FIGS. 8A and 8B, even when any read data is stored, a signal edge remains. Therefore, it is necessary to embed a new synchronization signal (e.g., clock) for each bridge circuit.

Thereafter, the read data of the second memory 152 and the first memory 151 is stored in the time direction. However, when read data is added in the time direction, no change occurs in the amplitude. Therefore, the description will be omitted assuming a signal edge remains, of course.

Next, an embedding timing of a synchronization signal (e.g., clock) for a write symbol will be described.

Figure 9:
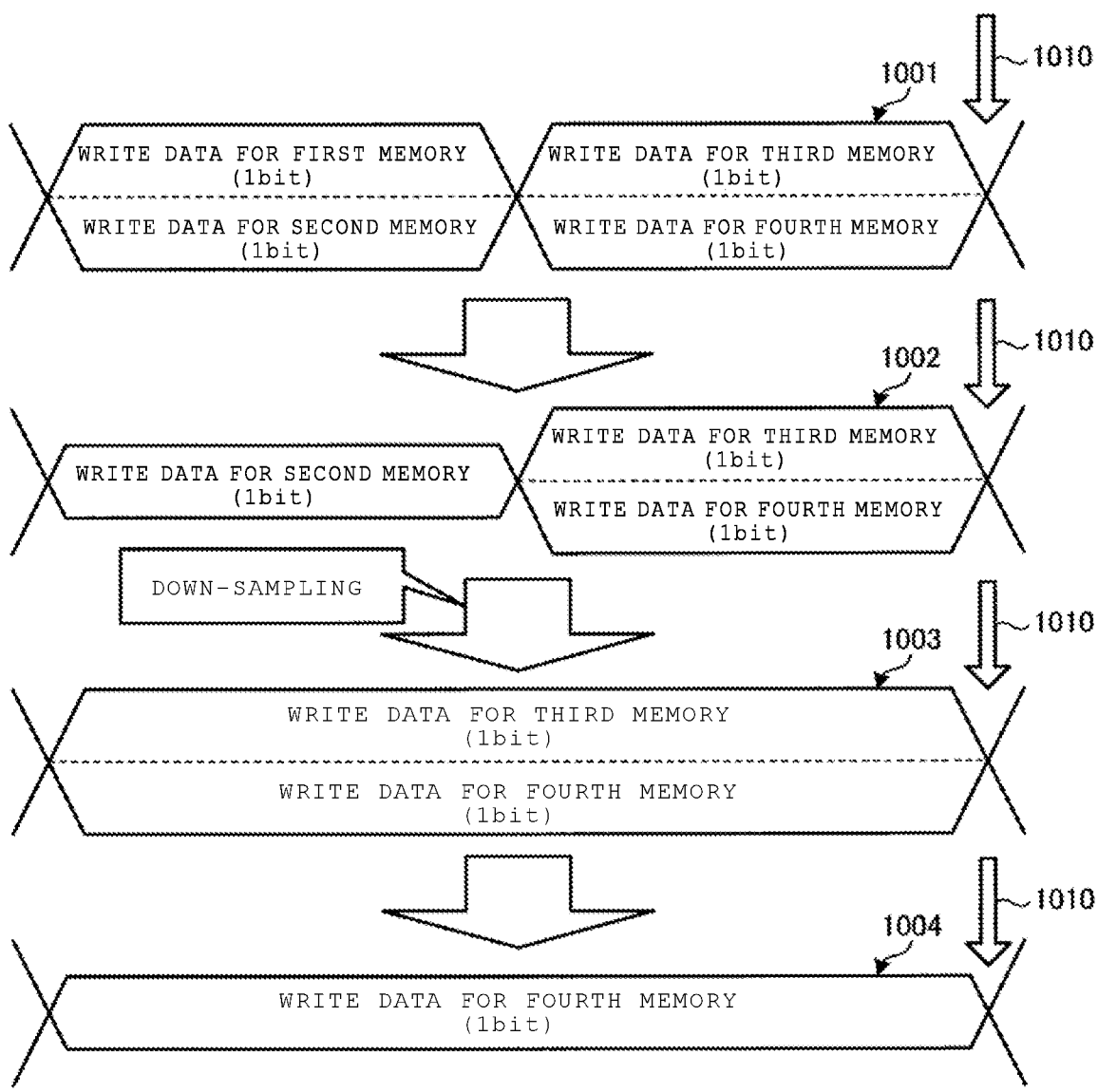
FIG. 9 is a diagram illustrating a relationship between a write symbol and an embedding timing according to Modification Example 1 of the first embodiment.

FIG. 9 is a diagram illustrating a relationship between a write symbol and an embedding timing according to Modification Example 1 of the first embodiment. As illustrated in FIG. 9, a write symbol 1001 is transmitted from the memory controller 100. The first bridge circuit 110 receiving the write symbol 1001 transmits a write symbol 1002 from which the write data for the first memory 151 is removed, to the second bridge circuit 120.

The second bridge circuit 120 receiving the write symbol 1002 transmits a write symbol 1003 from which the write data for the second memory 152 is removed. The third bridge circuit 130 receiving the write symbol 1003 transmits a write symbol 1004 from which the write data for the third memory 153 is removed to the fourth bridge circuit 140. In this way, whenever the write symbol passes through the bridge circuit, the write symbol is changed in the amplitude direction and the time direction.

However, a signal edge 1010 of the write symbol 1004 in which the remaining write data for the fourth memory 154 is stored, is in each of the write symbols 1001 to 1003.

Accordingly, the controller 103 of the memory controller 100 embeds the synchronization signal (e.g., clock) as amplitude information at a timing (the signal edge 1010) at which the amplitude of the write data (1 bit) for the fourth memory is changed, when the signal including the synchronization signal and the write symbol 1001 is transmitted.

Thus, without embedding the synchronization signal (e.g., clock) in the first bridge circuit 110 to the third bridge circuit 130, each of the first bridge circuit 110 to the fourth bridge circuit 140 can receive the write data (1 bit) based on the synchronization signal. In the modification example, since it is not necessary to embed the clock (the synchronization signal) for each bridge circuit, it is possible to improve data transmission efficiency.

Modification Example 2 of First Embodiment

In the first embodiment and Modification Example 1, there is no limitation on the process of phase synchronization with the synchronization signal when each reception circuit receives the write symbol and the read symbol. Incidentally, the CDR included in the bridge circuit has a phase tracking function. Accordingly, in a memory system according to Modification Example 2 of the first embodiment, a case in which the CDR has a phase synchronization function for the clocks embedded in the write symbol and the read symbol will be described. A configuration of Modification Example 2 is the same as that of the first embodiment. That is, the CDRs 115, 116, 125, 126, 135, 136, and 145 in the memory system 1 are assumed to have the phase tracking function.

In general, when the bridge circuits are connected in series, noise in the signal tends to increase as the number of bridge circuits through which the signal passes increases. For this reason, a problem occurs in that a bit error rate (BER) of data to be transmitted increases. Accordingly, the CDRs 115, 116, 125, 126, 135, 136, and 145 that prevent an increase in the BER will be described in Modification Example 2.

First, a case in which the memory controller 100 transmits a write symbol and a signal including the write symbol and the synchronization signal is transmitted and received between the first bridge circuit 110, the second bridge circuit 120, the third bridge circuit 130, and the fourth bridge circuit 140, will be described.

In this case, noise in the signal tends to increase as the number of bridge circuits (the first bridge circuit 110, the second bridge circuit 120, the third bridge circuit 130, and the fourth bridge circuit 140) through which the signal including the write symbol and the synchronization signal passes increases. Accordingly, in Modification Example 2, it is assumed that a bandwidth of CDRs that is tracked to a phase is widened in accordance with the number of bridge circuits through which the signal passes in the phase tracking function of the CDRs 115, 125, 135, and 145 of the bridge circuits.

Figure 10A:
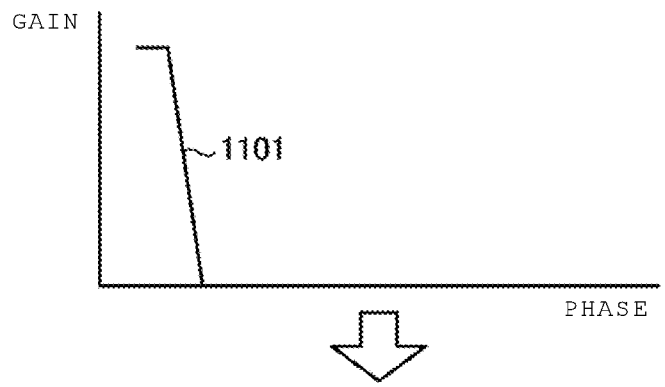
FIGS. 10A to 10D are diagrams illustrating a bandwidth in which a phase tracking function is performed for each CDR (clock and data recovery circuit) according to Modification Example 2 of the first embodiment.

FIGS. 10A to 10D are diagrams illustrating a bandwidth in which a phase tracking function is performed for each of the CDRs 115, 125, 135, and 145 according to Modification Example 2 of the first embodiment. FIG. 10A illustrates a first bandwidth 1101 in which the phase of the synchronization signal is corrected in the phase tracking function of the CDR 115 of the first bridge circuit 110. The first bandwidth 1101 may be set in accordance with any setting scheme and a bandwidth appropriate for an embodiment is set. In the example illustrated in FIGS. 10A to 10D, the vertical axis represents a gain and the vertical axis represents a phase.

The CDR 115 of the first bridge circuit 110 has a first phase tracking function of tracking the synchronization signal to the phase included in the first bandwidth 1101 when the write symbol 1001 including the synchronization signal is received. The CDR 115 performs phase synchronization on the synchronization signal embedded in the write symbol 1001. Then, the reception circuit 111 of the first bridge circuit 110 reads 1-bit data from the region allocated in advance to the first memory 151 and specified based on the extracted synchronization signal.

Figure 10B:
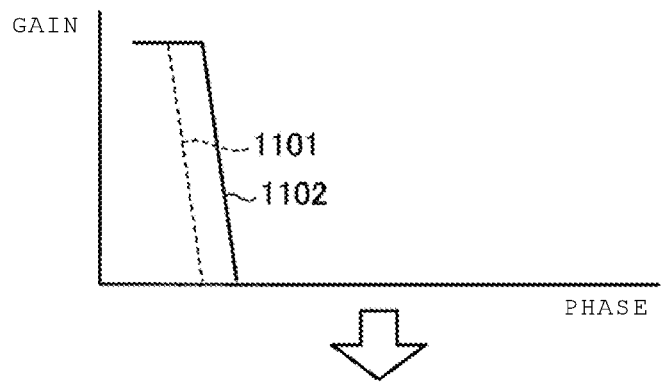

FIG. 10B illustrates a second bandwidth 1102 in which the CDR 125 of the second bridge circuit 120 performs the phase tracking function. The second bandwidth 1102 is wider than the first bandwidth 1101, as illustrated in FIGS. 10A and 10B.

The CDR 125 of the second bridge circuit 120 has a second phase tracking function of tracking the synchronization signal to the phase included in the second bandwidth 1102 when the write symbol 1002 including the synchronization signal is received. The CDR 125 performs phase synchronization on the synchronization signal embedded in the write symbol 1002. Then, the reception circuit 121 of the second bridge circuit 120 reads 1-bit data from the region allocated in advance to the second memory 152 and specified based on the extracted synchronization signal.

Figure 10C:
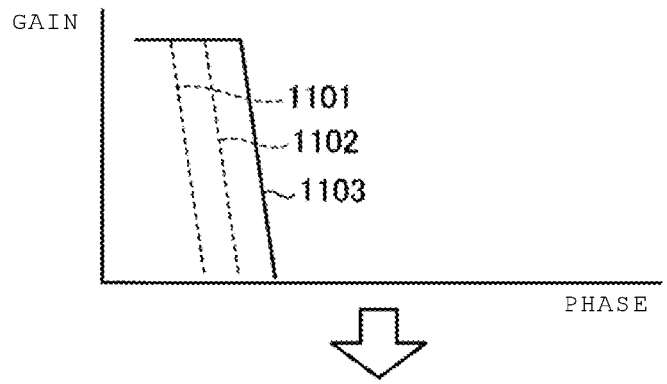

FIG. 10C illustrates a third bandwidth 1103 in which the CDR 135 of the third bridge circuit 130 performs the phase tracking function. The third bandwidth 1103 is wider than the first bandwidth 1101 and the second bandwidth 1102, as illustrated in FIGS. 10A, 10B, and 10C.

The CDR 135 of the third bridge circuit 130 has a third phase tracking function of tracking the synchronization signal to the phase included in the third bandwidth 1103 when the write symbol 1003 including the synchronization signal is received. The other functions of the CDR 135 are the same as those of the above-described embodiment, and the description thereof will be omitted.

Figure 10D:
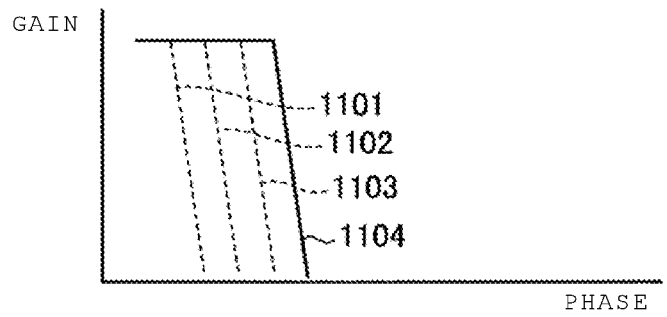

FIG. 10D illustrates a fourth bandwidth 1104 in which the CDR 145 of the fourth bridge circuit 140 performs the phase tracking function. The fourth bandwidth 1104 is wider than the first bandwidth 1101, the second bandwidth 1102, and the third bandwidth 1103 as illustrated in FIGS. 10A, 10B, 10C, and 10D.

The CDR 145 of the fourth bridge circuit 140 has a fourth phase tracking function of tracking the synchronization signal to the phase included in the fourth bandwidth 1104 when the write symbol 1004 including the synchronization signal is received. The other functions of the CDR 145 are the same as those of the above-described embodiment, and the description thereof will be omitted.

In Modification Example 2, resistance to noise mixed in a transmitted signal becomes strong by gradually widening of the bandwidth of the phase tracking function of the CDR in accordance with the number of bridge circuits through which the signal passes. In a stage in which the number of bridge circuits through which the signal passes is small, the bandwidth is narrow. Therefore, it is possible to realize a reduction in power consumption.

In the above-described example, the example in which the bandwidth in which the phase tracking function of the CDR is performed is widened in accordance with the number of bridge circuits through which the signal passes whenever the write symbol is exchanged will be described.

However, the process of widening the bandwidth in which the phase tracking function of the CDR is performed as described in the modification example is not limited to the case in which the write symbol is exchanged. For example, the bandwidth in which the phase tracking function of the CDR is performed may be widened in accordance with the number of bridge circuits through which the signal passes whenever the read symbol is exchanged. In this way, the symbol in which the plurality of pieces of data are collected can be applied in a form in which the symbol is exchanged between the plurality of bridge circuits.

Second Embodiment

Figure 11:
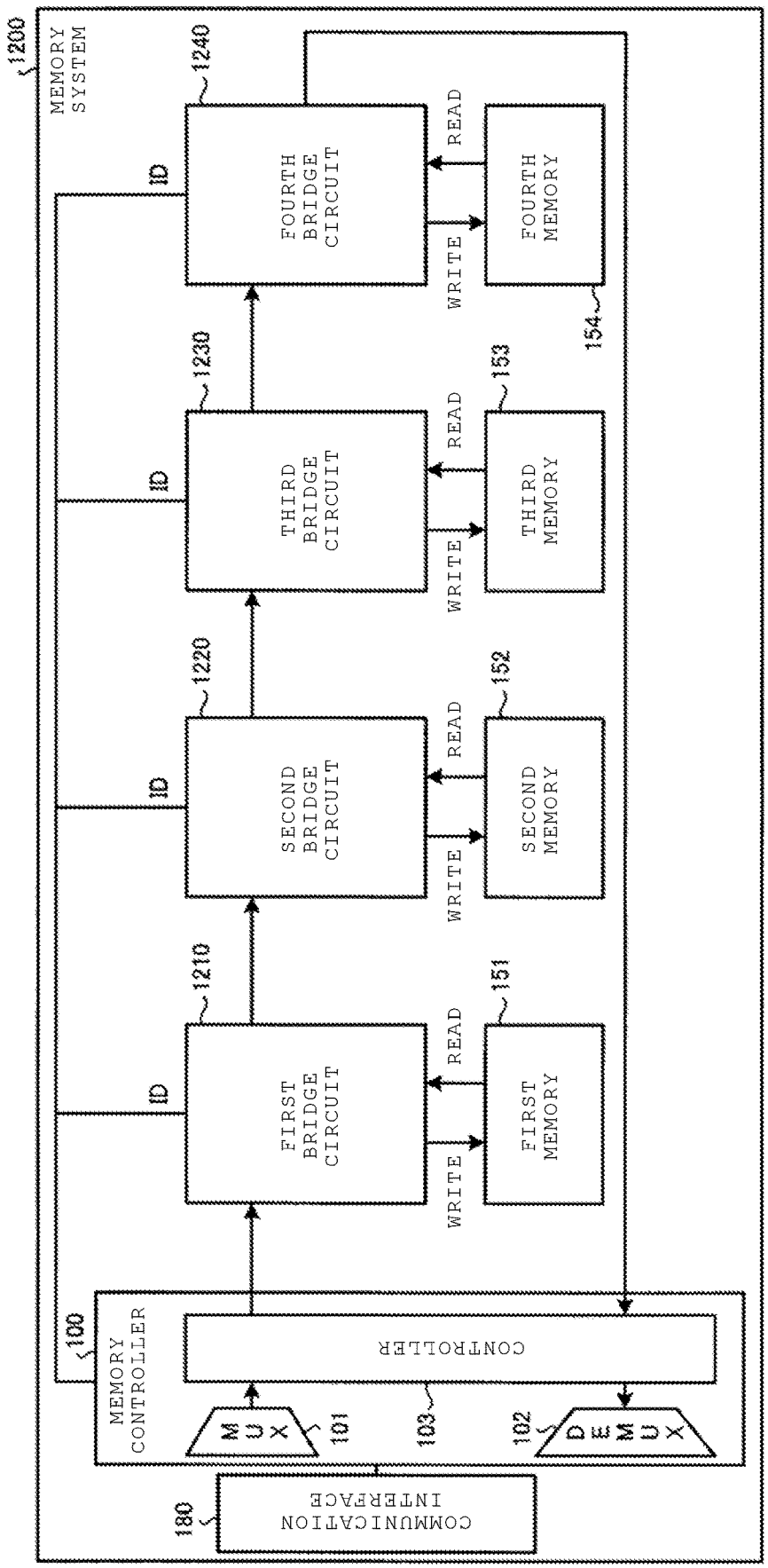
FIG. 11 is a diagram illustrating a memory system according to a second embodiment.

FIG. 11 is a diagram illustrating a configuration example of a memory system 1200 according to a second embodiment. A memory system 1200 includes a communication interface 180, a memory controller 100, a first bridge circuit 1210, a second bridge circuit 1220, a third bridge circuit 1230, a fourth bridge circuit 1240, a first memory 151, a second memory 152, a third memory 153, and a fourth memory 154. The same reference numerals are given to the same configurations as those of the first embodiment, and the description thereof will be omitted.

In the first embodiment, the examples in which the read and write symbols are separately exchanged have been described. In this embodiment, an example will be given in which a symbol in which read data and write data are collected, is exchanged.

That is, the first bridge circuit 1210 to the fourth bridge circuit 1240 each read write data from a region allocated in advance for each bridge in a symbol, remove the write data from the symbol, and subsequently replace the write data with the read data in the region of the symbol allocated in advance.

The memory controller 100 according to the embodiment transmits an ID uniquely identifying each bridge circuit to the first bridge circuit 1210 to the fourth bridge circuit 1240 at the time of activation. The first bridge circuit 1210 to the fourth bridge circuit 1240 can each identify a region allocated to the that bridge circuit in accordance with the transmitted ID.

Figure 12:
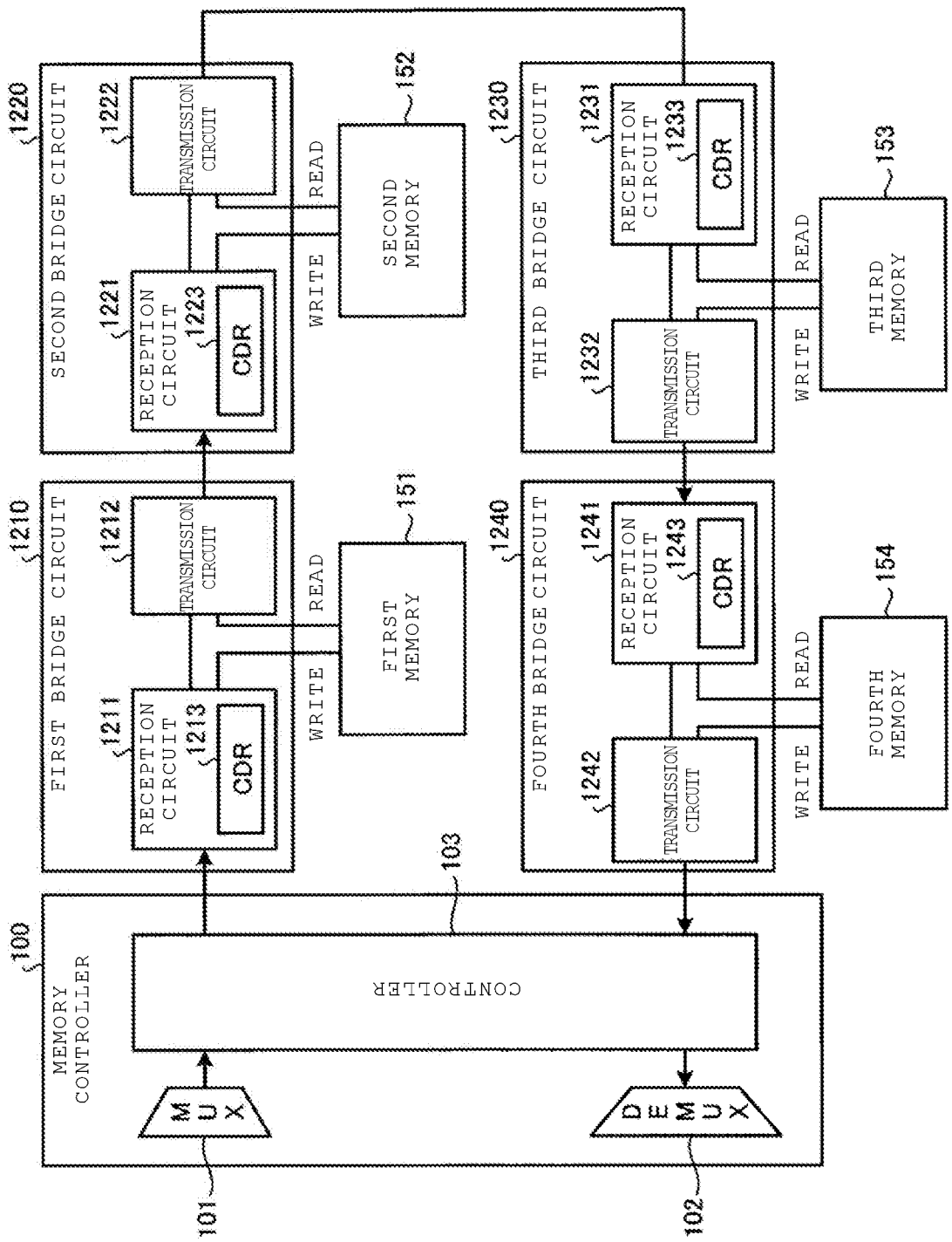
FIG. 12 is a diagram illustrating first to fourth bridge circuits of the memory system according to the second embodiment.

FIG. 12 is a diagram of the first bridge circuit 1210 to the fourth bridge circuit 1240 of the memory system 1200 according to the second embodiment.

The first bridge circuit 1210 is a bridge circuit that controls reading and writing of data from and to the first memory 151 and includes a reception circuit 1211 and a transmission circuit 1212.

The reception circuit 1211 includes a CDR 1213. The CDR 1213 synchronizes a phase with the synchronization signal (e.g., clock) transmitted along with the write symbol from the signal transmitted from the memory controller 100.

Figure 13:
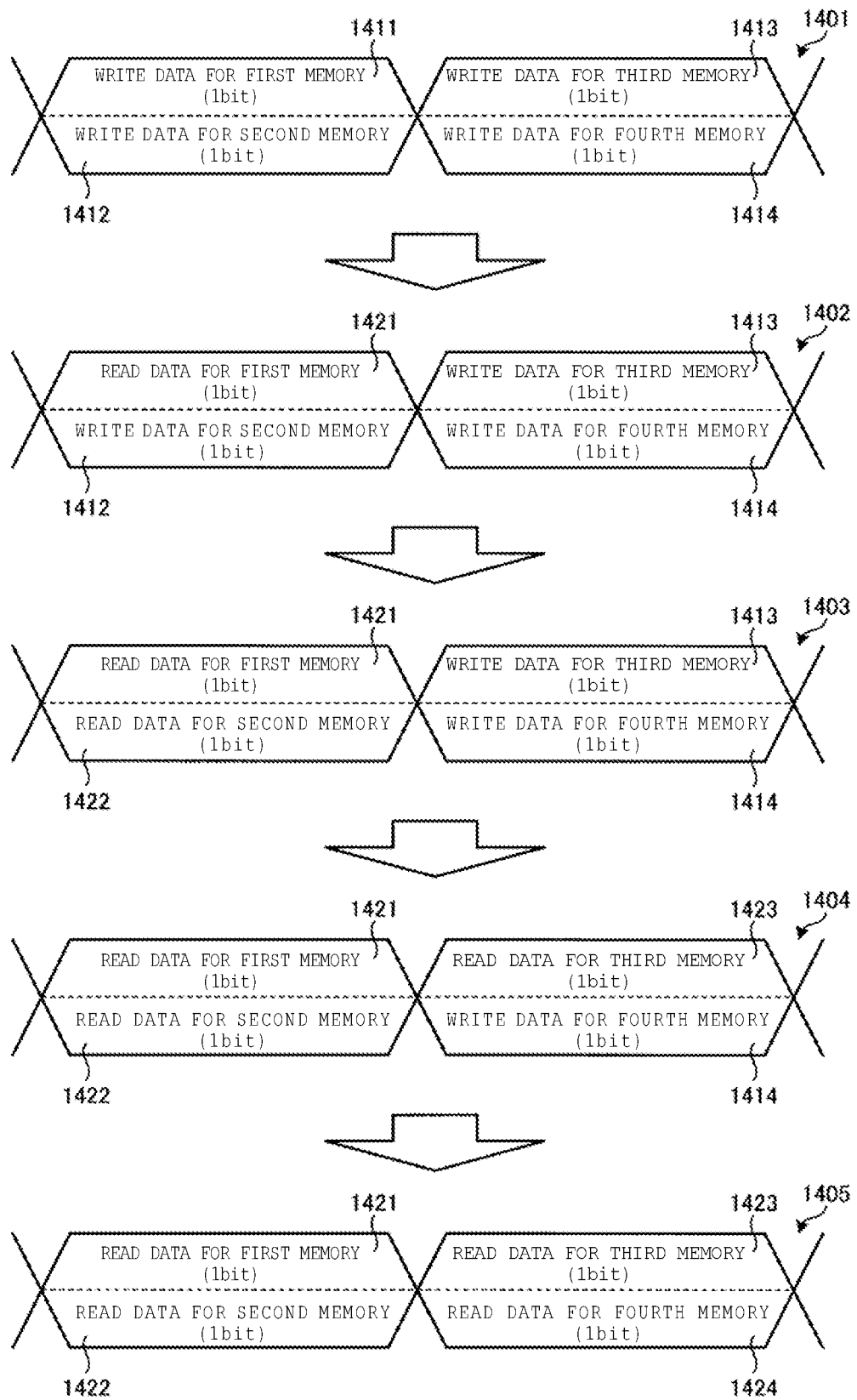
FIG. 13 is a diagram illustrating transition of a symbol transmitted in the memory system according to the second embodiment.

FIG. 13 is a diagram illustrating transition of a symbol transmitted in the memory system 1200 according to the embodiment. As illustrated in FIG. 13, the memory controller 100 transmits a symbol 1401 in which write data (1 bit) 1411 for the first memory 151, write data (1 bit) 1412 for the second memory 152, write data (1 bit) 1413 for the third memory 153, and write data (1 bit) 1414 for the fourth memory 154 are stored.

Then, the reception circuit 1211 reads the write data (1 bit) 1411 for the first memory 151 from the region allocated in advance to the first memory 151 in the symbol 1401 (illustrated in FIG. 13) transmitted from the memory controller 100 using the synchronization signal as a reference. Then, the reception circuit 1211 performs control for writing to the first memory 151 based on the write data 1411 for the first memory 151.

Thereafter, the reception circuit 1211 exchanges the symbol 1401 and the synchronization signal with the transmission circuit 1212.

The transmission circuit 1212 is assumed to receive the read data from the first memory 151.

Then, the transmission circuit 1212 generates, as a symbol 1402, data obtained by removing the write data (1 bit) 1411 for the first memory 151 from the region allocated for the first memory 151 in the symbol 1401 using the synchronization signal as a reference and subsequently storing the read data (1 bit) 1421 of the first memory 151 in the region allocated for the first memory 151.

As illustrated in FIG. 13, the symbol 1402 includes the read data (1 bit) 1411 of the first memory 151, the write data (1 bit) 1412 for the second memory 152, the write data (1 bit) 1413 for the third memory 153, and the write data (1 bit) 1414 for the fourth memory 154.

Then, the transmission circuit 1212 transmits a signal in which the synchronization signal received from the CDR 1213 is included in the symbol 1402 to the second bridge circuit 1220.

The second bridge circuit 1220 is a bridge circuit that controls reading and writing of data from and to the second memory 152 and includes a reception circuit 1221 and a transmission circuit 1222.

The reception circuit 1221 includes a CDR 1223. The CDR 1223 synchronizes a phase with the synchronization signal (e.g., clock) transmitted along with the symbol 1402 from the signal transmitted from the first bridge circuit 1210.

Then, the reception circuit 1221 reads the write data (1 bit) 1412 for the second memory 152 from the region allocated in advance to the second memory 152 in the symbol 1402 (illustrated in FIG. 13) transmitted from the first bridge circuit 1210 using the synchronization signal as a reference. Then, the reception circuit 1221 controls writing to the second memory 152 based on the write data 1412 for the second memory 152.

Thereafter, the reception circuit 1221 exchanges the symbol 1402 and the synchronization signal with the transmission circuit 1222.

The transmission circuit 1222 is assumed to receive the read data from the second memory 152.

Then, the transmission circuit 1222 generates, as a symbol 1403, data obtained by removing the write data (1 bit) 1412 for the second memory 152 from the region allocated for the second memory 152 in the symbol 1402 using the synchronization signal as a reference and subsequently storing the read data (1 bit) 1422 of the second memory 152 in the region allocated for the second memory 152.

As illustrated in FIG. 13, the symbol 1403 includes the read data (1 bit) 1421 of the first memory 151, the write data (1 bit) 1422 for the second memory 152, the write data (1 bit) 1413 for the third memory 153, and the write data (1 bit) 1414 for the fourth memory 154.

Then, the transmission circuit 1222 transmits a signal in which the synchronization signal received from the CDR 1223 is included in the symbol 1403 to the third bridge circuit 1230.

The third bridge circuit 1230 is a bridge circuit that controls reading and writing of data from and to the third memory 153 and includes a reception circuit 1231 and a transmission circuit 1232.

The reception circuit 1231 includes a CDR 1233. The CDR 1233 synchronizes a phase with the synchronization signal (e.g., clock) transmitted along with the symbol 1403 from the signal transmitted from the second bridge circuit 1220.

Then, the reception circuit 1231 reads the write data (1 bit) 1413 for the third memory 153 from the region allocated in advance to the third memory 153 in the symbol 1403 (illustrated in FIG. 13) transmitted from the second bridge circuit 1220 using the synchronization signal as a reference. Then, the reception circuit 1231 controls writing to the third memory 153 based on the write data 1413 for the third memory 153.

Thereafter, the reception circuit 1231 exchanges the symbol 1403 and the synchronization signal with the transmission circuit 1232.

The transmission circuit 1232 is assumed to receive the read data from the third memory 153.

Then, the transmission circuit 1232 generates, as a symbol 1404, data obtained by removing the write data (1 bit) 1413 for the third memory 153 from the region allocated for the third memory 153 in the symbol 1403 using the synchronization signal as a reference and subsequently storing the read data (1 bit) 1423 of the third memory 153 in the region allocated for the third memory 153.

As illustrated in FIG. 13, the symbol 1404 includes the read data (1 bit) 1421 of the first memory 151, the read data (1 bit) 1422 for the second memory 152, the read data (1 bit) 1423 for the third memory 153, and the write data (1 bit) 1414 for the fourth memory 154.

Then, the transmission circuit 1232 transmits a signal in which the synchronization signal received from the CDR 1233 is included in the symbol 1404 to the fourth bridge circuit 1240.

The fourth bridge circuit 1240 is a bridge circuit that controls reading and writing of data from and to the fourth memory 154 and includes a reception circuit 1241 and a transmission circuit 1242.

The reception circuit 1241 includes a CDR 1243. The CDR 1243 synchronizes a phase with the synchronization signal (e.g., clock) transmitted along with the symbol 1404 from the signal transmitted from the third bridge circuit 1230.

Then, the reception circuit 1241 reads the write data (1 bit) 1414 for the fourth memory 154 from the region allocated in advance to the fourth memory 154 in the symbol 1404 (illustrated in FIG. 13) transmitted from the third bridge circuit 1230 using the synchronization signal as a reference. Then, the reception circuit 1241 controls writing to the fourth memory 154 based on the write data 1414 for the fourth memory 154.

Thereafter, the reception circuit 1241 exchanges the symbol 1404 and the synchronization signal with the transmission circuit 1242.

The transmission circuit 1242 is assumed to receive the read data from the fourth memory 154.

Then, the transmission circuit 1242 generates, as a symbol 1405, data obtained by removing the write data (1 bit) 1414 for the fourth memory 154 from the region allocated for the fourth memory 154 in the symbol 1404 using the synchronization signal as a reference and subsequently storing the read data (1 bit) 1424 of the fourth memory 154 in the region allocated for the fourth memory 154.

As illustrated in FIG. 13, the symbol 1405 includes the read data (1 bit) 1421 of the first memory 151, the read data (1 bit) 1422 for the second memory 152, the read data (1 bit) 1423 for the third memory 153, and the read data (1 bit) 1424 for the fourth memory 154.

Then, the transmission circuit 1242 transmits a signal in which the synchronization signal received from the CDR 1243 is included in the symbol 1405 to the memory controller 100.

In the embodiment, by providing the above-described configuration, it is possible to realize transmission and reception of the data between the bridge circuits 1210 to 1240 and the memory controller 100 through the transmission and the reception of the symbols between the bridge circuits 1210 to 1240 formed in a ring state. At this time, since it is not necessary to store address information or the like in the symbol, it is possible to improve data transmission efficiency. In the case of the above-described configuration, the number of components is less than that of the related art. Therefore, it is possible to realize a reduction in power consumption and cost.

Modification Example

Figure 14:
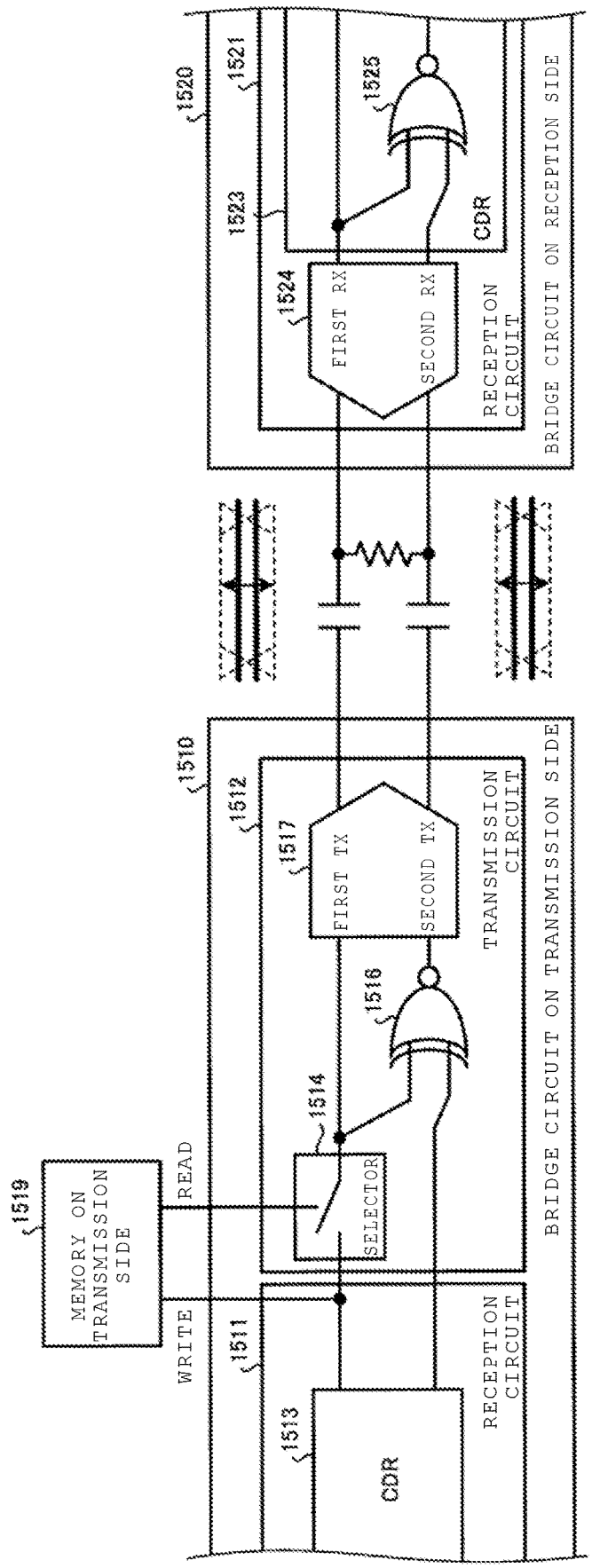
FIG. 14 is a diagram of abridge circuit on a transmission side and a bridge circuit on a reception side according to a modification example.

FIG. 14 is a diagram illustrating a configuration of a bridge circuit on a transmission side and a bridge circuit on a reception side according to a modification example. As illustrated in FIG. 14, a transmission side bridge circuit 1510 includes a reception circuit 1511 and a transmission circuit 1512. The modification example is an example in which the bridge circuit 1510 on the transmission side adds read data read from a memory 1519 on the transmission side to an amplitude of a read symbol. As long as the bridge circuit 1510 on the transmission side is a bridge circuit adding data to an amplitude, the bridge circuit 1510 may have any configuration of the first to fourth bridge circuits according to the above-described embodiments.

The reception circuit 1511 includes a CDR 1513, and the transmission circuit 1512 includes a selector 1514, an exclusive OR circuit 1516, and a transmission unit 1517 including a first transmitter (TX) and a second transmitter (TX).

The first transmitter (TX) transmits a signal from a first signal line. The second transmitter (TX) transmits a signal from a second signal line. Thus, the transmission unit 1517 transmits the read symbol and the synchronization signal to different signal lines (the first and second signal lines).

The bridge circuit 1520 on the reception side includes at least a reception circuit 1521. The reception circuit 1521 includes a reception unit 1524 including a first receiver (RX) and a second receiver (RX), an exclusive OR circuit 1525, and a CDR 1523.

The first receiver (RX) receives a signal from the first signal line. The second receiver (RX) receives a signal from the second signal line. Thus, the reception unit 1524 receives the read symbol and the synchronization signal from different signal lines (the first and second signal lines).

Incidentally, a bias occurs in data stored in the read symbol when added data is fixed to '0' at the time of adding the read data to the amplitude of the read symbol in accordance with the scheme of the related art. Therefore, there is a possibility of DC-balance collapsing. The bias in the data stored in the read symbol refers to a state in which data to be added is changed only between two amplitudes (voltages) on end sides side of four amplitude values (a voltage value of a signal) in order to fix the data to '0'. "Between the two amplitudes on the end sides" will be described in FIGS. 15A and 15B.

Figure 15A:
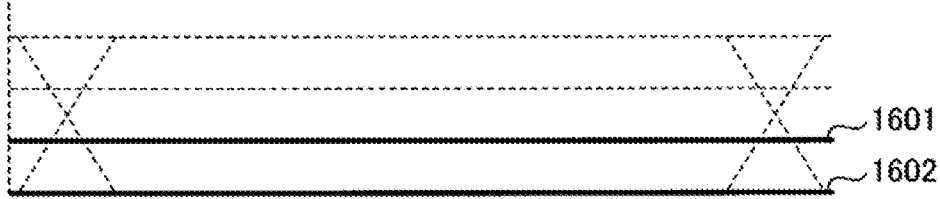
FIGS. 15A and 15B are diagrams illustrating a data width when a read symbol and a synchronization signal are transmitted with signal lines in accordance with a scheme of the related art.
Figure 15B:
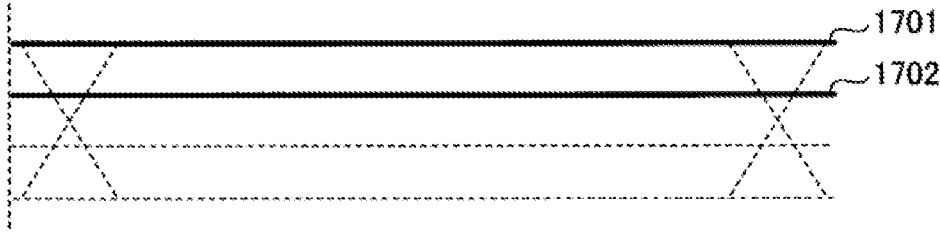

FIGS. 15A and 15B are diagrams illustrating a data width when a read symbol and a synchronization signal are transmitted with signal lines in accordance with a scheme of the related art. In the example illustrated in FIG. 15A, an amplitude of the read data is changed between thick lines 1601 and 1602. In the example illustrated in FIG. 15B, an amplitude of the synchronization signal is changed between thick lines 1701 and 1702. In this way, when signals are transmitted in accordance with a scheme of the related art, a bias occurs in data in some cases. In this case, there is a possibility of the DC-balance collapsing.

Accordingly, the transmission circuit 1512 according to the modification example is set to include the exclusive OR circuit 1516 and the selector 1514 switching the read data and the received read symbol. In the modification example, a process using the read symbol has been described. However, the modification example can also be applied to a process using the write symbol rather than being limited to the process using the read symbol.

The selector 1514 has a configuration in which one of the read symbol transmitted from the CDR 1513 and the read data transmitted from the memory 1519 on the transmission side is received and switched, and is used according to whether data is not stored in the time direction and passes. That is, depending on a bridge circuit, storing data in the time direction and adding data in the amplitude direction is switched when the read data is added. Accordingly, the selector 1514 is provided to be adapted to the switching.

The exclusive OR circuit 1516 performs an exclusive OR operation between a signal (the read symbol read from the memory 1519 or the read symbol transmitted from the bridge circuit installed before the bridge circuit 1510 on the transmission side) including the read symbol output from the selector 1514 and the synchronization signal output from the CDR 1513.

Figure 16A:
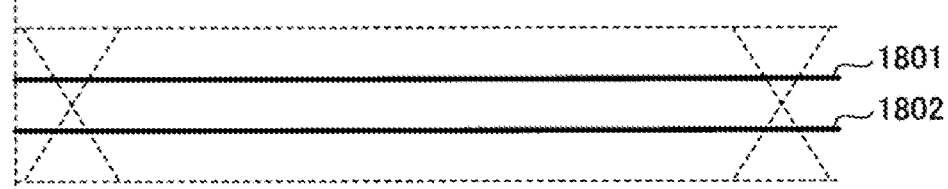
FIGS. 16A and 16B are diagrams illustrating a data width of a read symbol and a synchronization signal transmitted with signal lines according to the modification example.
Figure 16B:
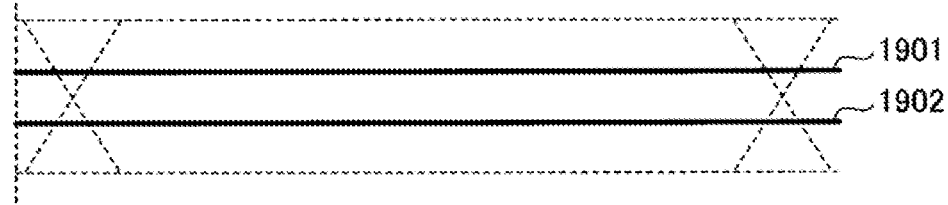

FIGS. 16A and 16B are diagrams illustrating a data width of the read symbol and the synchronization signal transmitted with signal lines according to the modification example. In the example illustrated in FIG. 16A, the read data is changed between thick lines 1801 and 1802. In the example illustrated in FIG. 16B, an amplitude of the synchronization signal is changed thick lines 1901 and 1902.

In this way, in the modification example, by providing the above-described configuration, the data obtained by performing amplitude modification on the read symbol received from a previous bridge circuit can be set as a read symbol. That is, of four amplitude values (voltage values of signals), the modulation is performed by the read symbol so that the read data is changed between two amplitudes (voltages) on the low voltage side and the high voltage side centering on a bias voltage. Therefore, it is possible to maintain the DC balance.

The bridge circuit 1520 on the reception side performs a process based on the synchronization signal and the read symbol received from the bridge circuit 1510 on the transmission side. A scheme for the process will be omitted.

In the above-described embodiments and modification examples, by providing the above-described configuration, it is possible to realize transmission of data to each bridge circuit without storing an address of the bridge circuit of a transmission destination. Thus, it is possible to improve data transmission efficiency. Accordingly, in the embodiments and the modification examples, it is possible to realize an improvement in a data transmission speed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   first, second, third, and fourth memory, each of which is a nonvolatile memory;
   a memory controller configured to modulate first write data for the first memory and second write data for the second memory into a first time slot of a data signal according to an allocation scheme, and modulate third write data for the third memory and fourth write data for the fourth memory into a second time slot of the data signal that is subsequent to the first time slot, according to the allocation scheme, wherein the allocation scheme defines in which of the first and second time slots the first to fourth write data for the first, second, third, and fourth memory are to be modulated, respectively, and transmit the data signal;
   a first bridge circuit configured to extract the first write data from the first time slot of the data signal transmitted by the memory controller according to the allocation scheme, and replace the first write data in the first time slot of the data signal with first read data and then transmit the data signal;
   a second bridge circuit configured to extract the second write data from the first time slot of the data signal transmitted by the first bridge circuit according to the allocation scheme, and replace the second write data in the first time slot of the data signal with second read data and then transmit the data signal;
   a third bridge circuit configured to extract the third write data from the second time slot of the data signal transmitted by the second bridge circuit according to the allocation scheme, and replace the third write data in the second time slot of the data signal with third read data and then transmit the data signal; and
   a fourth bridge circuit configured according to the allocation scheme to extract the fourth write data from the second time slot of the data signal transmitted by the third bridge circuit.

2. The memory system according to claim 1, wherein the allocation scheme also defines a format for modulating write data for two different memory into one time slot.

3. The memory system according to claim 1, wherein each of the first, second, and third bridge circuits is configured to read first, second, and third read data from the first, second, and third memory, respectively.

4. The memory system according to claim 3, wherein the fourth bridge circuit is configured to replace the fourth write data in the second time slot of the data signal transmitted by the third bridge circuit with fourth read data that is read from the fourth memory.

5. The memory system according to claim 4, wherein the controller is configured to transmit the data signal containing the first, second, third, and fourth write data to the first bridge circuit, and receive data signal containing the first, second, third, and fourth read data from the first bridge circuit.

6. The memory system according to claim 1, wherein each of the bridge circuits includes a clock and data recovery circuit configured to perform phase synchronization on the data signal against a synchronization signal.

7. The memory system according to claim 6, wherein the synchronization signal is embedded in the data signal.

8. The memory system according to claim 6, wherein the synchronization signal and the data signal are transmitted separately.

9. The memory system according to claim 6, wherein the clock and data recovery circuits (CDRs) of the each bridge circuit are each configured to correct a phase of the synchronization signal using bandwidths having different widths, the bandwidth for the CDR of the first bridge circuit being the narrowest and the bandwidth for the CDR of the fourth bridge circuit being the widest.

10. The memory system according to claim 4, wherein the controller is configured to transmit the data signal containing the first, second, third, and fourth write data to the first bridge circuit, and receive a different data signal containing the first, second, third, and fourth read data that is read from the first, second, third, and fourth memory, respectively, from the first bridge circuit.

11. The memory system according to claim 10, wherein the first and second read data are modulated into a third time slot of the different data signal, and the third and fourth read data are modulated into a fourth time slot of the different data signal that is subsequent to the third time slot.

12. The memory system according to claim 11, wherein base data of the different data signal is transmitted from the fourth bridge circuit to the third bridge circuit, then from the third bridge circuit to the second bridge circuit, and then from the second bridge circuit to the first bridge circuit.

13. The memory system according to claim 11, wherein the base data of the different data signal contains only the fourth read data when transmitted from the fourth bridge circuit to the third bridge circuit, only the third and fourth read data when transmitted from the third bridge circuit to the second bridge circuit, and only the second, third, and fourth data when transmitted from the second bridge circuit to the first bridge circuit.

14. A memory system comprising:
a plurality of nonvolatile memory packages;
a plurality of circuits, each connected to and controlling read and write operations performed on one of the nonvolatile memory packages; and
a memory controller circuitry directly connected to at least one of the circuits and not all of the circuits and configured to modulate first write data to be written into one of the nonvolatile memory packages and second write data to be written into another one of the nonvolatile memory packages into multiple time slots of a data signal according to an allocation scheme, and transmit the data signal,
wherein each of the circuits, upon receipt of the data signal, extracts write data to be written into the nonvolatile memory package connected thereto, according to the allocation scheme, and replace the write data in the data signal with read data read from the nonvolatile memory package connected thereto and then transmit the data signal.

15. The memory system according to claim 14, wherein the plurality of circuits include a first circuit directly connected to the memory controller to receive the data signal from the memory controller, a second circuit directly connected to the first circuit to receive the data signal from the first circuit, a third circuit directly connected to the second circuit to receive the data signal from the second circuit, and a fourth circuit directly connected to the third circuit to receive the data signal from the third circuit.

16. The memory system according to claim 15, wherein the first circuit is also configured to transmit a different data signal containing read data from each of the nonvolatile memory packages to the memory controller.

17. The memory system according to claim 15, wherein the fourth circuit is directly connected to the memory controller to transmit the data signal to the memory controller.

18. The memory system according to claim 17, wherein the data signal transmitted from the fourth circuit to the memory controller contains read data from each of the nonvolatile memory packages.

* * * * *